United States Patent [19]

Thiriet

[11] Patent Number: 5,798,506

[45] Date of Patent: Aug. 25, 1998

[54] MEMORY CARD AND A METHOD FOR MAKING MORE RELIABLE A REQUEST FOR ACCESS TO AN APPLICATION

[75] Inventor: Fabien Thiriet, Orleans, France

[73] Assignee: Solaic, Puteaux, France

[21] Appl. No.: 621,609

[22] Filed: Mar. 26, 1996

[30] Foreign Application Priority Data

Mar. 31, 1995 [FR] France ................... 95 03837

[51] Int. Cl.$^6$ ................... G06K 19/067
[52] U.S. Cl. ................... 235/379; 235/380; 235/492; 902/25; 902/26
[58] Field of Search ................... 235/375, 379, 235/380, 492; 902/25, 26; 395/238, 241, 244; 705/41

[56] References Cited

U.S. PATENT DOCUMENTS

| | | | |
|---|---|---|---|
| 4,766,293 | 8/1988 | Boston | 235/379 |
| 4,812,628 | 3/1989 | Boston et al. | 235/380 |

FOREIGN PATENT DOCUMENTS

| | | |
|---|---|---|
| 0337794 | 4/1989 | European Pat. Off. . |
| 0418144 | 9/1990 | European Pat. Off. . |
| 2589268 | 10/1986 | France . |
| 8906398 | 12/1988 | WIPO . |
| 9406103 | 9/1993 | WIPO . |

OTHER PUBLICATIONS

Fuzzy Sets and Systems, vol. 68, No.1, Nov. 1994, Amsterdam, NI pp. 1–11 R.R. Yager et all. 'Fuzmar : An Approach To Aggregating Market Research Data Based On Fuzzy Reasoning'.

*Primary Examiner*—F. L. Evans
*Attorney, Agent, or Firm*—Griffin, Butler, Whisenhunt & Szipl, LLP

[57] ABSTRACT

For a memory card that includes memory blocks containing reliability parameters ($P_1$, $P_2$, and $P_3$) and respective reliability weights ($PF_1$, $PF_2$, and $PF_3$), for the parameters, the method comprises the following steps:

- determining the reliability weights corresponding to the access request;
- computing an interactive reliability weight (PFI) as a function of the respective reliability weights of the access request;
- comparing the interactive reliability weight with an access reliability index (FA); and
- authorizing or refusing access to the application as a function of the results of the comparison.

9 Claims, 2 Drawing Sheets

FIG_1

5,798,506

MEMORY CARD AND A METHOD FOR MAKING MORE RELIABLE A REQUEST FOR ACCESS TO AN APPLICATION

The present invention relates to a memory card serving to make more reliable a request for access to an application, and to a method of making more reliable a request for access to an application.

BACKGROUND OF THE INVENTION

Systems are known that associate terminals with memory cards to permit access to an application run by the terminal after verifying that the card inserted into the terminal is suitable for giving access to the corresponding application. In particular, one such verification consists in comparing a personal identity number input by the user with a secret code contained in the card, and in giving access to the application only when the comparison is successful. In order to improve the reliability of access request processing and to prevent a fraudulent user from proceeding without hindrance with a large number of successive access requests, present-day cards also include a memory block that stores the number of access requests during which an erroneous personal identification number has been input by the user, together with inhibit means for putting the card out of operation whenever said number of erroneous access requests reaches a predetermined maximum.

In such systems, access control is performed in Boolean manner and it is not possible to detect fraudulent use of the card once the user has responded in satisfactory manner to questions put to the user.

In order to combat abusive use of the card, possibly even by the card's own cardholder, systems are known, in particular from documents EP-A-418 144 and WO-A-89/06398, in which the terminal includes means for analyzing the requested transaction and statistical means for comparing the transaction with transactions normally performed by other users in relation to the application under consideration in order to determine whether the transaction request can be considered as being a normal request or an abnormal request. In order to avoid penalizing an honest user, it is necessary to provide very considerable computer means for storing and processing the information required for statistically evaluating the risk represented by the transaction. Such a system therefore suffers from the drawback of being very expensive. In addition, the statistical processing is performed with reference to a large number of users such that when a card is used by a fraudulent user who has taken a card from its cardholder and is using it to perform transactions that are similar to those performed by other users, there is no way of detecting the fraudulent nature of the access request.

OBJECTS AND SUMMARY OF THE INVENTION

An object of the invention is to propose a card and a method enabling a request for access to an application to be made reliable in a personalized manner.

According to the invention, this object is achieved by providing a memory card including a main microprocessor associated with an input/output block and with memory blocks, in which at least one of the memory blocks contains reliability parameters and respective reliability weights for said parameters.

Thus, each card can be personalized to correspond to the cardholders' habits by acting on the reliability weights of the various parameters, so that when said parameters are processed in the event of a request for access to an application, the response to the request for access is automatically personalized.

In an advantageous version of the invention, the memory card further includes a table of interactions between the parameters. Thus, even when identical reliability weights are given to different cardholders, it remains possible to personalize the card for each user by acting on the interaction table.

In another aspect, the invention provides a method of making more reliable a request for access to an application by means of a memory card, the card containing reliability parameters associated with respective reliability weights, the method comprising the following steps:

determining the reliability weights corresponding to the access request;

computing an interactive reliability weight as a function of the respective reliability weights of the access request;

comparing the interactive reliability weight with an access reliability index; and authorizing or refusing access to the application as a function of the results of the comparison.

When access is refused, the method preferably includes a step of reducing the reliability weight of at least one of the reliability parameters or of increasing the acces reliability index. Thus, when a card is used by a fraudulent user unaware of the habits of the cardholder, the conditions required for access to an application are caused to increase progressively in severity so that the card quickly becomes unusable.

Conversely, when access is authorized, the method preferably includes a step of increasing at least one reliability weight for at least one of the reliability parameters for a situation corresponding to the access request. Thus, if a cardholder seeks to change habits, then it is possible for the cardholder to cause the conditions under which an access request is evaluated to be modified in progressive manner.

BRIEF DESCRIPTION OF THE DRAWINGS

Other characteristics and advantages of the invention appear on reading the following description of a particular, non-limiting embodiment of the invention, given with reference to the accompanying drawings, in which.

Figure 1:
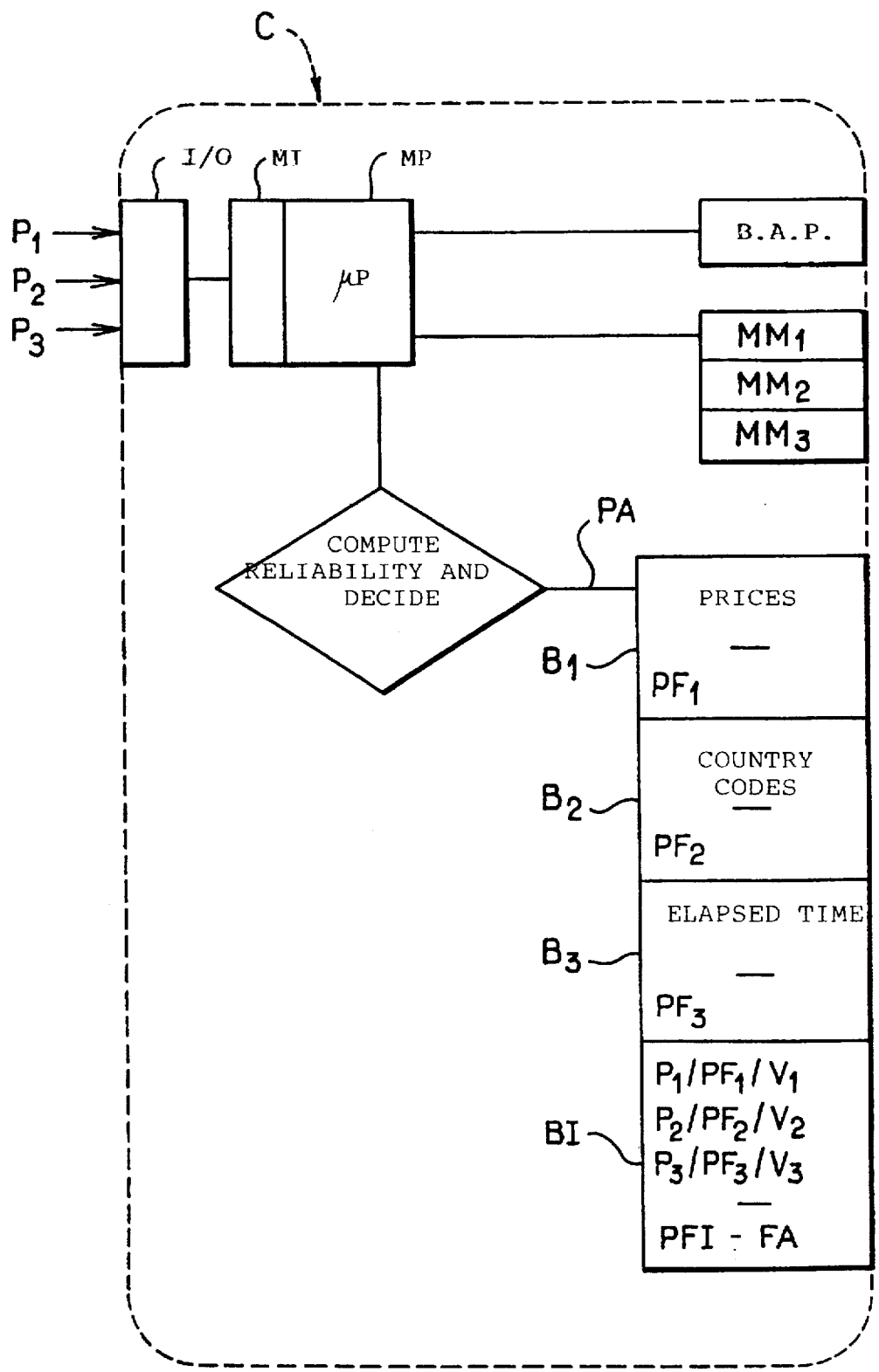
FIG. 1 is a block diagram of the various modules and microprocessors in a memory card of the invention.

The memory card given reference C is intended to supervise the purchase habits of a user who has correctly input a personal identification number allocated to the user by a bank.

Prior to authorizing a purchase, three parameters $P_1$, $P_2$, and $P_3$ are taken into account by the memory card:

parameter $P_1$ is the purchase price;

parameter $P_2$ is the purchase location; and parameter $P_3$ is the time elapsed since the previous purchase.

The memory card includes an input/output (I/O) block for communication with the outside world, to read the parameters $P_1$, $P_2$, and $P_3$ during an attempted purchase.

The I/O block is connected to a main microprocessor MP with known inhibit means MI for enabling use of the memory card to be inhibited, where appropriate.

The microprocessor MP is connected to the following:

banking application programs BAP;

memory components $MM_1$, $MM_2$, and $MM_3$ for storing the parameters $P_1$, $P_2$, and $P_3$ respectively;

electronic computing and comparison components for computing the reliability of each attempted purchase and for giving instructions to the inhibit means MI concerning parameterizing or aborting the attempted purchase; and an additional processor PA.

The additional processor PA comprises an interaction memory block BI and three other memory blocks $B_1$, $B_2$, and $B_3$ respectively allocated to each of the parameters.

Block $B_1$ contains the purchase prices that can be requested and the corresponding reliability weights $PF_1$. By way of example, the following may apply to $B_1$:

| Requested purchased price | Reliability weight $PF_1$ |
| --- | --- |
| 0 to 20 | 0.01 |
| 21 to 40 | 0.5 |
| 41 to 250 | 1 |
| 251 to 500 | 0. 5 |
| 501 to 3000 | 0.01 |
| more than 3000 | 0 |

Block $B_2$ contains the code of the requested purchase locations and the corresponding reliability weights $PF_2$. For example:

| Country code | Reliability weight $PF_2$ |
| --- | --- |
| France | 0.7 |
| Germany | 0.2 |
| Other countries | 0.1 |

Block $B_3$ contains the times that have elapsed between successive purchases, computed from the most recent purchase, together with the corresponding reliability weights $PF_3$. For example:

| Elapsed time, depending on country | $PF_3$ |
| --- | --- |
| Less than one day or one day in France | 1 |
| More than one day in France | 0.1 |
| Less than one day or one day abroad | 0.1 |
| More than one day abroad | 1 |
| More than five days abroad | 0 |

The above data is stored in the memory card as a function of the purchasing habits of the user, with higher reliability weights being given to situations that are more frequent. In the example given:

average purchases (70% of cases) lie in the range 41 to 250;

they take place in France in 70% of cases, and in Germany in 20% of cases; and purchases are frequent in France (three per day on average), but rare abroad (one every three days).

The interaction block BI contains a table of interactions between the parameters. This interaction table serves to weight the importance of each parameter independently of its respective reliability weight. For example:

| Parameter | Reliability weight | Interaction value |
| --- | --- | --- |
| $P_1$ | $PF_1$ | $V_1 = 0.30$ |
| $P_2$ | $PF_2$ | $V_2 = 0.50$ |
| $P_3$ | $PF_3$ | $V_3 = 0.20$ |

The block BI also contains in its memory a reliability index FA, e.g. FA=0.2.

The dedicated processor PA can thus compute the interactive reliability weight PFI, defined in this non-limiting example by the following equation:

$$PFI=(PF_1 \times V_1)+(PF_2 \times V_2)+(PF_3 \times V_3)$$

When the user seeks to make a purchase, the reliability weights corresponding to the three parameters $P_1$, $P_2$, and $P_3$ are determined by dialog with the terminal into which the card has been inserted, with the amount being input via the keypad of the terminal, while the location and the date are provided automatically by the terminal. The reliability weights obtained in this way are stored in $MM_1$, $MM_2$, and $MM_3$, respectively. In this respect, it should be observed that in the present example, the situation of the parameter $P_3$ is determined by comparison with the date of the preceding transaction. To this end, it is preferable for the block $B_3$ to be provided with a location enabling the date of the previously-performed transaction to be stored, which date is updated at the end of each transaction.

Thereafter, the processor PA computes the interactive reliability weight PFI using the interaction table BI.

Finally, the processor PA compares the interactive reliability weight PFI with the index FA and informs the card if the reliability is sufficient to authorize access to the banking application program.

In this example, if PFI is $\geq 0.20$, purchase is authorized, whereas if PFA is $<0.20$, purchase is refused.

For example:

the user makes a first purchase in Paris:

then, on the same day, a second purchase for 200 F in Paris, and while this second purchase is being made, the interactive reliability weight is given by the following equation:

$(0.3 \times PF_1)$ + $(0.5 \times PF_2)$ + $(0.2 \times PF_3)$, i.e.
0.3 + 0.35 + 0.2 = 0.85

(sufficient reliability, purchase authorized);

then on the same day, the user makes a third purchase for 20 F, still in Paris:

$(0.3 \times 0.01)$ + $(0.5 \times 0.7)$ + $(0.2 \times 1)$, i.e.
0.003 + 0.35 + 0.02 = 0.5503

(sufficient reliability, purchase authorized);

that same day, the user goes to Germany and makes a purchase for 200 F:

$(0.3 \times 1)$ + $(0.5 \times 0.2)$ + $(0.2 \times 0.1)$, i.e.
0.3 + 0.1 + 0.02 = 0.42

(sufficient reliability, purchase authorized); and finally, on that same day, the user seeks to make a purchase for 2000 F in Germany:

$$(0.3 \times 0.001) + (0.5 \times 0.2) + (0.3 \times 0.1), \text{ i.e.}$$
$$0.003 + 0.01 + 0.03 = 0.106$$

(insufficient reliability, purchase refused).

As a function of a user's habits, a system designed in this way can improve supervision of memory cards in numerous applications.

Figure 2:
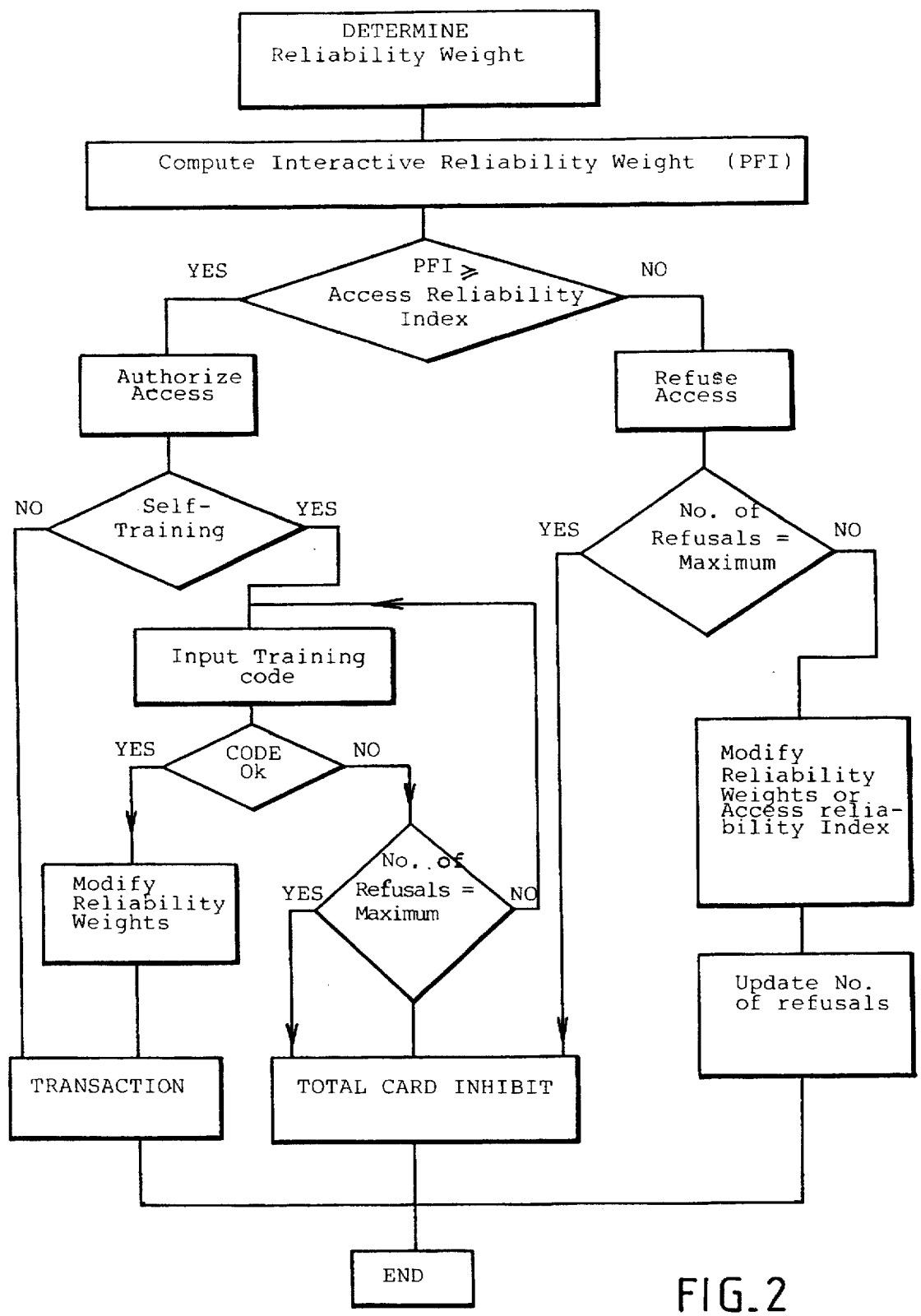
FIG. 2 is a flow chart showing the method implemented in a card of the invention.

FIG. 2 shows a more sophisticated method that can be implemented in the card of the invention. As before, this method includes a step of determining reliability weights for each of the parameters as a function of an access request, and then computes an interactive reliability weight which is compared with the access reliability index.

If access is refused, it is verified whether the number of refusals has reached the maximum predetermined number of refusals. If the maximum predetermined number has been reached, then the card is totally inhibited. This procedure serves to prevent a fraudulent user who has obtained the card for any reason whatsoever and who also knows the personal identification number of the cardholder from being able to proceed with successive access requests in order to determine the habits of the cardholder. In this respect, it should be observed that even though a third party may be able to observe the personal identification number of a cardholder while the number is being keyed in, the access habits of the user relative to the application in question can never be observed at any one given time by a third party, so the invention significantly increases the reliability of access to the application under consideration.

If access is refused without the number of refusals reaching the maximum predetermined number, then, in accordance with the invention, it is preferable to reduce the reliability weights associated with at least one of the parameters, or to increase the access reliability index. In either case, when the interactive reliability weight is compared with the reliability index, the comparison will be less favorable to the user of the card than it was before the change, and will therefore lead to access to the application being monitored more strictly, such that a fraudulent user unaware of the habits of the cardholder will quickly find access to the application being refused whatever the conditions under which a request for access is performed. Once the user has made a number of access requests reaching the predetermined maximum, then the card will be definitively inhibited.

Conversely, when access is authorized, the user is offered a self-training step for the purpose of enabling a change of user habits to be stored in the card. If the user does not desire to change habits, then the self-training step is refused and the transaction is performed without changing the reliability weights initially recorded in the card. Otherwise, if the user does indeed wish to proceed with a self-training step, then it is preferable for an additional verification to be performed by asking the user to input a training code which is compared with a secret code stored in the card in a manner analogous to the personal identification number. If the training code is wrong, the user is given the option of trying again providing the number of errors does not reach some predetermined maximum. If the number of wrong training code inputs reaches the predetermined maximum, then the card is totally inhibited.

Assuming that the training code as input is correct, then the self-training step is performed. This self-training step consists in increasing the reliability weight of at least one of the reliability parameters for a situation corresponding to that of the access that has been authorized. In accordance with the invention, it is preferable to provide for the reliability weight of the same reliability parameter to be simultaneously reduced for situations differing from the requested access. In a table comprising $k$ rows associating different situations with corresponding reliability weights, provision may be made to increase the reliability weight relating to the situation for which access has just been authorized by an amount $k - 10\%$, while simultaneously reducing the reliability weights of the other rows by 10%. When an access request is authorized for a price of 2000 F in association with above-mentioned block $B_1$, then the row corresponding to this purchase value is increased by 60% such that the reliability weight is raised to 0.016, while each of the other reliability weights is reduced by 10%. Naturally, it is possible to provide upper and lower limits for reliability weights, beyond which no further modification is performed.

In the context of the self-training procedure, provision may also be made to return immediately to the initial reliability weights whenever they are reduced due to access being refused.

Naturally, the invention is not limited to the embodiment described, and variant embodiments may be provided without going beyond the ambit of the invention as defined in the claims.

In particular, although the card in the example described includes an interaction table enabling the relative importance of each of the parameters to be weighted, it is possible, in accordance with the invention, to provide for the interaction values to be incorporated directly in the reliability weights of each of the parameters.

Also, although the invention is described above with reference to a reliability index which is stored in the card and which is therefore common to all of the applications to which the card can give access, it is possible to associate a different reliability index with each application, in which case the reliability index is contained in the terminal corresponding to the application and is communicated for the purpose of being compared with the interactive reliability weight.

Although the invention is described above with reference to computing an interactive reliability weight in the form of a weighted sum of individual reliability weights, it is possible to perform the computation in the form of a product:

$$PFI = PF_1 \times PF_2 \times PF_3$$

or any other form and to adapt the access reliability index FA correspondingly.

Although the invention is described above with reference to a location code that corresponds to different countries, it is also possible to provide for different reliability weights as a function of different cities in the same country.

Although the invention is described above with reference to a single acess reliability index, it is also possible to provide various values of the access reliability index and to modulate the decision as a function of the value reached by the interactive reliability weight. In the example described above it is for example possible to take into account two values of the access reliability index, 0.1 and 0.2. When the interactive reliability weight exceeds the highest value 0.2 the access is naturally authorized. When the interactive reliability weight falls between the two values of the access reliability index, the access is authorized upon condition, for example when the price does not exceed Francs 100, and is refused in an opposite situation. When the interactive reliability weight is below the lowest value 0.1 the access is refused whatever be the price.

In order to increase the safety in case the card has been stolen it is preferably provided to reduce the individual reliability weights or to increase the access reliability index not only when the access is refused but also when it is authorized upon condition.

It is also possible to provide for various tables of reliability weights for some parameters as a function of the location of the access request, or to vary the self-training function according to the number of accesses already authorized.

I claim:

1. A memory card including a main microprocessor associated with an input/output block and with memory blocks, wherein at least one of the memory blocks contained reliability parameters and respective reliability weights for said parameters, a series of values of reliability weights being assigned for each reliability parameter according to corresponding values of said parameter.

2. A memory card according to claim 1, further including a table of interactions between the reliability parameters.

3. A memory card according to claim 1, wherein the microprocessor includes means for computing an interactive reliability weight corresponding to a request for access to an application, and means for comparing it with an access reliability index.

4. A method of making more reliable a request for access to an application by means of a memory card, the card containing reliability parameters associated with respective reliability weights to which are assigned series of values for each reliability parameter according to respective values of the reliability parameter, and the method comprising the following steps:

determining for each reliability parameter the value of the reliability weight corresponding to the value of said reliability parameter in the access request;

computing an interactive reliability weight as a function of the respective reliability weights thus determined;

comparing the interactive reliability weight with an access reliability index; and authorizing or refusing access to the application as a function of the results of the comparison.

5. A method according to claim 4, wherein, in the event of access being refused, the method includes a step of reducing the value of the reliability weight of at least one of the reliability parameters or of increasing the access reliability index.

6. A method according to claim 4, including the steps of storing the number of accesses refused and of totally inhibiting the card when the number of access refusals reaches a maximum predetermined number.

7. A method according to claim 4, wherein, in the event of access being authorized, the method includes the step of increasing at least one reliability weight of at least one of the reliability parameters for a situation corresponding to the access request.

8. A method according to claim 7, including the step of reducing the reliability weight for situations different from the access request and relating to the parameter whose reliability weight has been increased.

9. A method according to claim 4, wherein the access to the application is modulated as a function of a value of the interactive reliability weight as compared to various values of the access reliability index.

* * * * *